(12) United States Patent
Ganga et al.

(10) Patent No.: US 11,063,884 B2
(45) Date of Patent: Jul. 13, 2021

(54) ETHERNET ENHANCEMENTS

(71) Applicant: Intel Corporation, Santa Clara, CA (US)

(72) Inventors: Ilango Ganga, Cupertino, CA (US); Alain Gravel, Thousand Oaks, CA (US); Thomas Lovett, Portland, OR (US); Radia Perlman, Redmond, WA (US); Greg Regnier, Portland, OR (US); Anil Vasudevan, Portland, OR (US); Hugh Wilkinson, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/554,064

(22) Filed: Aug. 28, 2019

(65) Prior Publication Data
US 2019/0386934 A1    Dec. 19, 2019

Related U.S. Application Data

(63) Continuation of application No. 14/496,667, filed on Sep. 25, 2014, now Pat. No. 10,404,625.
(Continued)

(51) Int. Cl.
*H04L 12/939* (2013.01)
*H04L 1/16* (2006.01)
(Continued)

(52) U.S. Cl.
CPC .......... *H04L 49/552* (2013.01); *H04L 1/1621* (2013.01); *H04L 49/251* (2013.01); *H04L 49/9057* (2013.01)

(58) Field of Classification Search
CPC combination set(s) only.
See application file for complete search history.

(56) References Cited

U.S. PATENT DOCUMENTS 8,953,631 B2   2/2015 Naouri et al.
8,964,525 B1   2/2015 Kuthanur et al.
(Continued)

FOREIGN PATENT DOCUMENTS

WO   2013147807 A1   10/2013

OTHER PUBLICATIONS

"Combining the Good Things from Vehicle Networks and High-Performance Networks" Herbert Ecker and Misikir Armide. Technical Report, IDE0705. (Year: 2007).
(Continued)

*Primary Examiner* — Xavier S Wong
(74) *Attorney, Agent, or Firm* — Compass IP Law PC

(57) ABSTRACT

This disclosure describes enhancements to Ethernet for use in higher performance applications like Storage, HPC, and Ethernet based fabric interconnects. This disclosure provides various mechanisms for lossless fabric enhancements with error-detection and retransmissions to improve link reliability, frame pre-emption to allow higher priority traffic over lower priority traffic, virtual channel support for deadlock avoidance by enhancing Class of service functionality defined in IEEE 802.1Q, a new header format for efficient forwarding/routing in the fabric interconnect and header CRC for reliable cut-through forwarding in the fabric interconnect. The enhancements described herein, when added to standard and/or proprietary Ethernet protocols, broadens the applicability of Ethernet to newer usage models and fabric interconnects that are currently served by alternate fabric technologies like Infiniband, Fibre Channel and/or other proprietary technologies, etc.

16 Claims, 12 Drawing Sheets

Related U.S. Application Data

(60) Provisional application No. 61/896,977, filed on Oct. 29, 2013.

(51) Int. Cl.
*H04L 12/947* (2013.01)
*H04L 12/861* (2013.01)

(56) References Cited

U.S. PATENT DOCUMENTS

| | | | |
|---|---|---|---|
| 9,030,963 B2 | 5/2015 | Mahasenan et al. | |
| 10,404,625 B2* | 9/2019 | Ganga | H04L 49/552 |
| 2006/0104304 A1 | 5/2006 | Nara et al. | |
| 2006/0107166 A1 | 5/2006 | Nanda | |
| 2006/0274789 A1 | 12/2006 | Pong | |
| 2007/0156725 A1* | 7/2007 | Ehret | G10L 19/167 |
| 2008/0019395 A1* | 1/2008 | Aithal | H04L 1/0016 |
| | | | 370/468 |
| 2008/0022184 A1 | 1/2008 | Jeong et al. | |
| 2008/0212613 A1 | 9/2008 | Perkinson et al. | |
| 2011/0019685 A1 | 1/2011 | Diab et al. | |
| 2011/0310911 A1 | 12/2011 | Froehler et al. | |
| 2012/0307631 A1* | 12/2012 | Yang | H04L 43/0876 |
| | | | 370/230 |
| 2013/0016724 A1* | 1/2013 | Thaler | H04L 47/245 |
| | | | 370/393 |
| 2014/0029625 A1* | 1/2014 | Edmiston | H04L 47/623 |
| | | | 370/401 |
| 2014/0143854 A1* | 5/2014 | Lopez | H04L 63/0218 |
| | | | 726/14 |
| 2014/0269731 A1 | 9/2014 | DeCusatis et al. | |
| 2015/0009823 A1 | 1/2015 | Ganga et al. | |
| 2015/0058707 A1 | 2/2015 | Lee et al. | |
| 2015/0113363 A1 | 4/2015 | Lee et al. | |

OTHER PUBLICATIONS

Boiger, Christian, "Credit Based Shaper with Preemption Support", !EEE 802.1 Interim, Ottawa, Canada, Sep. 10, 2014, 14 pages.
Boiger, Christian, "Interspersing Express Traffic and Time Aware Shaping", Joint 802.1 TSN/802.3 DMLT, Victoria, Canada, 16 pages.
Boiger, Christian, "Time Aware Shaper in Combination with Qbu", IEEE 802 Plenary, Mar. 20, 2013, Orlando, Florida, 10 pages.
Cisco, "Time-Sensitive Networking: A Technical Introduction", Time-Sensitive Networking: A Technical Introduction, White Paper, Cisco Public, © 2017 Cisco and/or its affiliates. All rights reserved, 8 pages.
Finn, Norman, "IEEE P802.1Qbu status", Cisco, IEEE 802.1 interim, May 15, 2014, 8 pages.
Jeffree, Anthony, "Standard for Local and metropolitan area networks—Media Access Control (MAC) Bridges and Virtual Bridged Local Area Networks Amendment: Frame Preemption.", Amendment to IEEE Standard 802.1Q-2011, Jan. 19, 2012, 2 pages.
Teener, Michael Johas, Goals for Ethernet links in 802.1 Qbu networks, Chair IEEE 802.1 AVB Task Group, 6 pages.
Thaler, Pat, "Alternatives for IET Management Relationships", Broadcom, Sep. 11, 2014, 2 pages.
Wikipedia, "IEEE 802.3br and 802.1Qbu Interspersing Express Traffic (IET) and Frame Preemption", https://en.wikipedia.org/wiki/Time-Sensitive_Networking#IEEE_802.3br_and_802.1Qbu_Interspersing_Express_Traffic_(IET)_and_Frame_Preemption, 2 pages.
Winkel, et al., "Distinguished minimum latency traffic in a converged traffic environment", IEEE 802.3 Ethernet Working Group, IEEE 802.3 Tutorial, SG DMLT, Version 1.0, Jul. 15, 2013, 77 pages.

\* cited by examiner

1200

Transmit a first Ethernet frame to a network node, the first Ethernet frame including a field for specifying a sequence number associated with the first Ethernet frame.

1210

Receive a status frame including a field for specifying transmission status of the first Ethernet frame and a field for specifying the sequence number associated with the first Ethernet frame, wherein the transmission status indicates success or failure.

1220

Retransmitting the first Ethernet frame to the node in response to detection of the transmission status as failure.

ETHERNET ENHANCEMENTS

CROSS-REFERENCE TO RELATED APPLICATION(S)

This application is a Continuation of U.S. patent application Ser. No. 14/496,667 filed Sep. 25, 2014, and claims the benefit of U.S. Provisional Application Ser. No. 61/896,977, filed Oct. 29, 2013, the contents of which are hereby incorporated by reference in their entirety.

FIELD

The present disclosure relates to enhancements for Ethernet network systems.

BACKGROUND

Currently, Ethernet (e.g., IEEE Specifications 802.3, 802.1Q, etc.) applicability to alternative, higher performance, fabric technologies like Infiniband, Fibre Channel, and/or proprietary technologies, etc. is limited. For example, the current Ethernet versions do not have a mechanism to recover from packet loss due to link errors; rather, upper layer transport protocols provide reliability or retransmission services. In another example, while 802.1Q provides user-priority fields for prioritizing high priority traffic, currently there is no mechanism to prevent higher priority packets from waiting until low priority packets have completed transmission. In addition, conventional Ethernet protocols do not provide an effective mechanism to avoid deadlocks, other than dropping packets, which may not meet operational requirements of lossless environments. In addition, conventional Ethernet protocols have a fixed, relatively large packet (frame) structure that may be inefficient for higher speed applications. In addition, current Ethernet protocols use Media Access Control (MAC) addresses for forwarding at the Layer 2 level, and typical implementations use additional upper layer headers including Transmission Control Protocol/Internet Protocol (TCP/IP) and User Datagram Protocol (UDP) for flow forwarding which may increase latency and reduce forwarding efficiency. In addition, conventional Ethernet does not have mechanisms to ensure header integrity.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 12 illustrates a flowchart of operations of one example embodiment consistent with the present disclosure Although the following Detailed Description will proceed with reference being made to illustrative embodiments, many alternatives, modifications, and variations thereof will be apparent to those skilled in the art.

DETAILED DESCRIPTION

This disclosure describes a set of enhancements to Ethernet for use in higher performance applications like storage, high performance computing (HPC), and Ethernet-based fabric interconnects. This disclosure provides fabric enhancements that may be used in lossless environments. The fabric enhancements include error detection and retransmissions to improve link reliability, frame pre-emption to allow higher priority traffic over lower priority traffic, virtual channel mechanisms for deadlock avoidance by enhancing class of service functionality defined in the "IEEE 802.1Q Standard" (cited below), a new header format for efficient forwarding/routing in the fabric interconnect and header checksum (CRC) for reliable cut-through forwarding in fabric interconnect. These enhancements, when added to standard and/or proprietary Ethernet protocols, broadens the applicability of Ethernet to newer usage models and fabric interconnects that are currently served by alternate fabric technologies like Infiniband, Fibre Channel and/or other proprietary technologies, etc.

Figure 1:
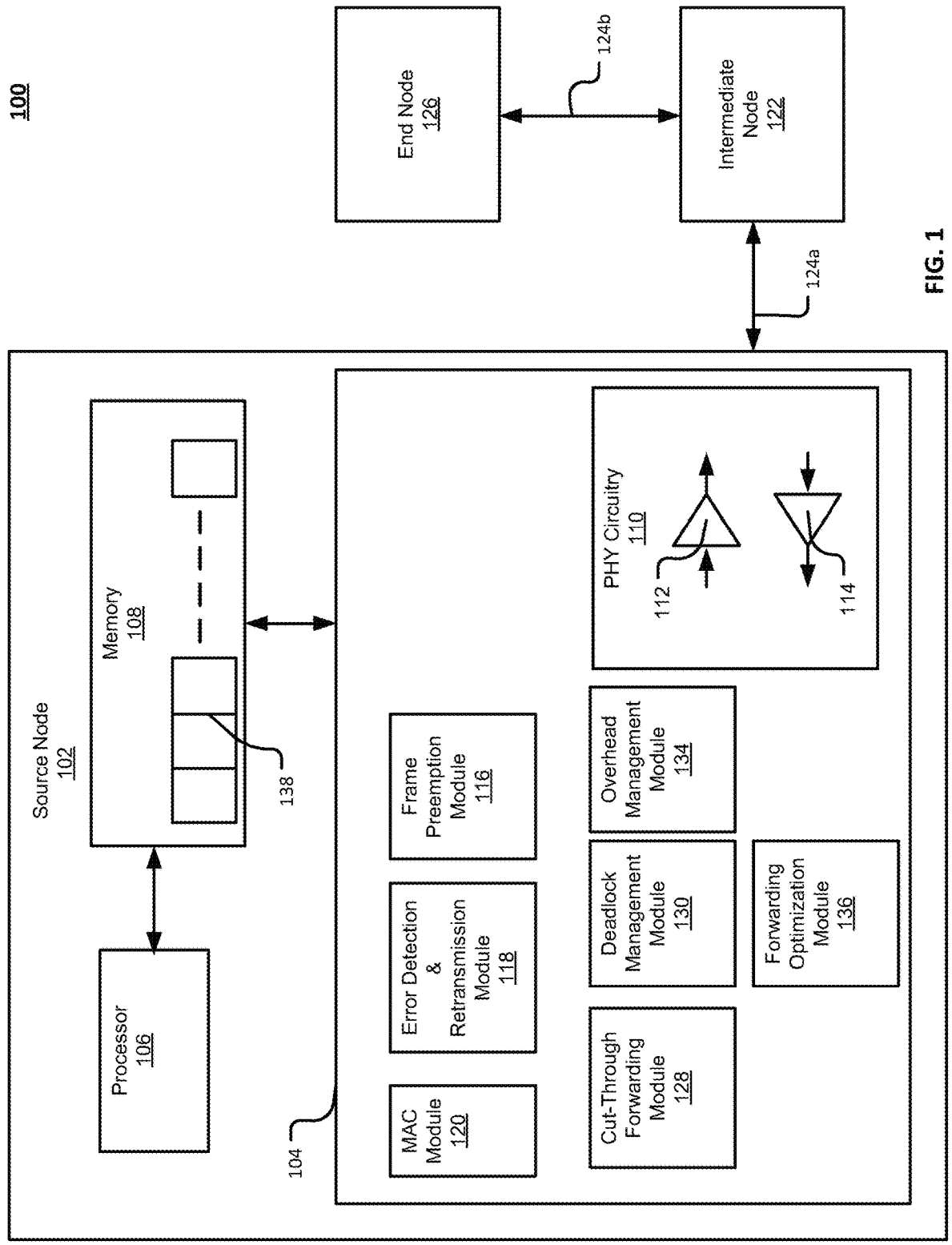
FIG. 1 illustrates a network system consistent with various embodiments of the present disclosure.

FIG. 1 illustrates a network system 100 consistent with various embodiments of the present disclosure. Network system 100 generally includes at least one network node element 102 (also referred to herein as "source node 102" or "sender node"), at least one intermediate node element 122 (also referred to herein as "receiving node" or "sender node") and an end node element 126 (also referred to herein as "receiving node"), each configured to communicate with one another via communications links 124a and 124b, as shown. The source node 102, intermediate node 122 and the end node 126 may be included as link partners in a network fabric. It is to be understood that the illustration of FIG. 1 is only for ease of description and that the network fabric may include a plurality of intermediate node elements and/or end node elements, each connected in series and/or parallel with each other and or/with the source node 102, to form for example, a torus network topology, ring topology, Clos topology, fat tree topology, etc. The source node 102, intermediate node 122 and/or end node 126 may each comprise a computer node element (e.g., host server system, laptop, tablet, workstation, etc.), switch, router, bridge, hub, fabric interconnect, network storage device, network attached device, non-volatile memory (NVM) storage device, etc.

It will be appreciated that the terms "source node" and "end node" are used to simplify the description and are not meant to imply a unidirectional transmission flow. Although one side of a full duplex connection may often be referred to herein, the operations are also applicable to the reverse direction (e.g., from end node 126 to source node 102).

The source node 102 includes a network controller 104 (e.g., network interface card, etc.), a system processor 106 (e.g., multi-core general purpose processor, such as those provided by Intel Corp., etc.) and system memory 108. The system memory 108 may include one or more buffers 138, each of which may be established and/or controlled, at least in part, by the network controller 104 and or system processor 106. The intermediate node 122 and/or end node 126 each may be configured and operate in a similar manner as the node 102, as described in greater detail below.

The source node 102, the intermediate node 122 and the end node 126 may communicate with each other, via links 124a and 124b, using, for example, an Ethernet communications protocol. The Ethernet communications protocol may be capable of providing communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard," published in March, 2002 and/or later versions of this standard, for example, the IEEE 802.3 Standard for Ethernet, published 2012. The Ethernet protocol may also comply or be compatible with the IEEE standard for Media Access Control (MAC) Bridges and Virtual Bridged Local Area Networks titled "IEEE 802.1Q Standard," published, 2005 or later versions of this standard, for example, the IEEE 802.1Q Standard published, 2011. In other embodiments, the source node 102, the intermediate node 122 and the end node 126 may communicate with each other, via links 124a and 124b using, for example, a custom and/or proprietary communications protocol, such as that described in at least one embodiment herein. The custom and/or proprietary communications protocol may be at least partially compliant with the aforementioned 802.3 and/or 802.1Q Ethernet communications protocols. The following description provides examples of various operations and frame structures that are either "IEEE 802.3-compatible" or "enhanced Ethernet" types. The "enhanced Ethernet" type may be at least partially compliant with one or more of the aforementioned 802.3 and/or 802.1Q Ethernet communications protocols.

The network controller 104 includes PHY circuitry 110 generally configured to interface the node 102 with the intermediate node 122, via communications link 124a. PHY circuitry 110 may comply or be compatible with, the aforementioned IEEE 802.3 Ethernet communications protocol, which may include, for example, 10GBASE-T, 10GBASE-KR, 40GBASE-KR4, 40GBASE-CR4, 100GBASE-CR10, 100GBASE-CR4, 100GBASE-KR4, and/or 100GBASE-KP4 and/or other PHY circuitry that is compliant with the aforementioned IEEE 802.3 Ethernet communications protocol and/or compliant with an after-developed communications protocol. PHY circuitry 110 includes transmit circuitry (Tx) 112 configured to transmit data packets and/or frames to the intermediate node 122, via link 124a, and receive circuitry (Rx) 114 configured to receive data packets and/or frames from the intermediate node 122, via link 124a. Of course, PHY circuitry 110 may also include encoding/decoding circuitry (not shown) configured to perform analog-to-digital and digital-to-analog conversion, encoding and decoding of data, analog parasitic cancellation (for example, cross talk cancellation), and recovery of received data. Rx circuitry 114 may include phase lock loop circuitry (PLL, not shown) configured to coordinate timing of data reception from the intermediate node 122.

The communications link 124a and/or 124b may each comprise, for example, a media dependent interface that may include, for example, copper twin-axial cable, backplane traces on a printed circuit board, fibre optic cable, copper twisted pair cable, etc. In some embodiments, the communications links 124a and 124b each may include a plurality of logical and/or physical channels (e.g., differential pair channels) that provide separate connections between, for example, the Tx and Rx 112/114 of the node 102 and an Rx and Tx, respectively, of the intermediate node 122. In the case of the intermediate node 122, (for example a switch or a router) there may not be an explicit network controller 104 within the intermediate node, however the functional blocks illustrated for the network controller 104 may be included as part of the switch or router logic or silicon. "Link Level," as used herein, means frame communication between, for example, source node 102 and intermediate node 122 through a link 124a. Thus, in this context, the "link" includes frame transmission between node 102 and node 122 over link 124a. For example, TX circuitry of node 102 sends frames to RX circuitry (not shown) of node 122 over single link 124a and any retransmission request, sequence number etc., is valid within this link context. Therefore, "link level" reliability means ensuring reliable frame transmission within each link between any two nodes.

Network controller 104 also includes a media access control (MAC) module 120 configured to provide addressing and channel access control protocols for communication with the intermediate node 122 and/or the end node 126, as may be defined by the aforementioned Ethernet communications protocol (e.g., MAC module 120 may be a Layer 2 device). The network controller 104 may also include an error detection and retransmission module 118 generally configured to provide link-level error detection and frame retry (e.g., frame retransmission) capabilities. The network controller 104 may also include a frame preemption module 116 generally configured to interrupt transmission of low priority packets for high priority packets. The network controller 104 may also include a cut-through forwarding module 128 generally configured to enable a node to begin forwarding a received frame before the entirety of the frame has arrived. The network controller 104 may also include an overhead management module 134 generally configured to reduce frame overhead. The network controller 104 may also include a forwarding optimization module 136 generally configured to optimize flow through the network fabric. It should be understood that, in some embodiments, a node may include a subset of the modules illustrated in FIG. 1 and therefore, not all of the illustrated modules are necessary for any embodiment. Each of the modules 116, 118, 128, 130, 134, and 136 will be described in greater detail below.

Figure 2:
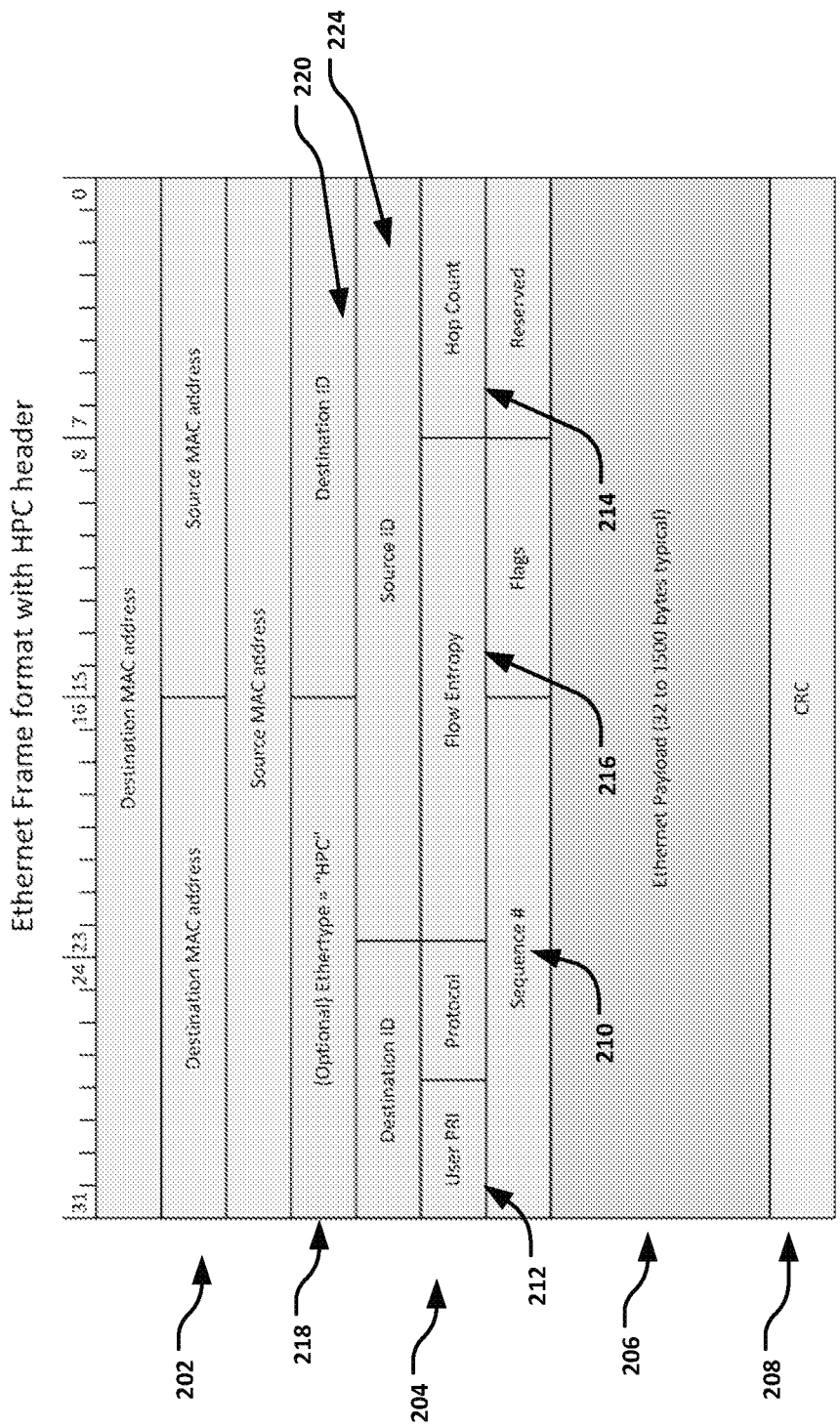
FIG. 2 illustrates an Ethernet frame consistent with several embodiments of the present disclosure.

Ia. Link-Level Error Detection and Retransmission Using IEEE 802.3-Compatible Frame Formats FIG. 2 illustrates an Ethernet frame 200 consistent with several embodiments of the present disclosure. With continued reference to FIG. 1, the frame 200 may be generated by the source node 102 to forward one or more data packets to an intermediate node 122 and/or end node 126. Thus, frame 200 may be viewed as the "sender node" frame format. The frame 200 generally includes a standard Ethernet MAC addressing portion 202, a payload portion 206 and a checksum or cyclic redundancy check (CRC) portion 208. In addition, and in contrast to a typical IEEE 802.3 frame format, yet still compatible with an IEEE 802.3 frame format, the frame 200 also includes an additional header portion 204. Pertinent to this embodiment, the additional header portion 204 includes a sequence number field 210 that may include one or more bits to identify a sequence number of at least one frame. In some embodiments, the sequence number field 210 may be used to identify a single frame, and in other embodiments, the sequence number field may be used to identify a series (e.g., sequence) of a set of frames (e.g., frames 11-20). The frame size of frame 200 may be defined by IEEE 802.3, for example, 64 byte frame size that includes a 12 octet inter-frame gap and an 8 octet preamble. The additional header portion 204 may have a size of 14/16 octets, which may be an optimum size for forwarding in certain environments, e.g., HPC environments.

Figure 3:
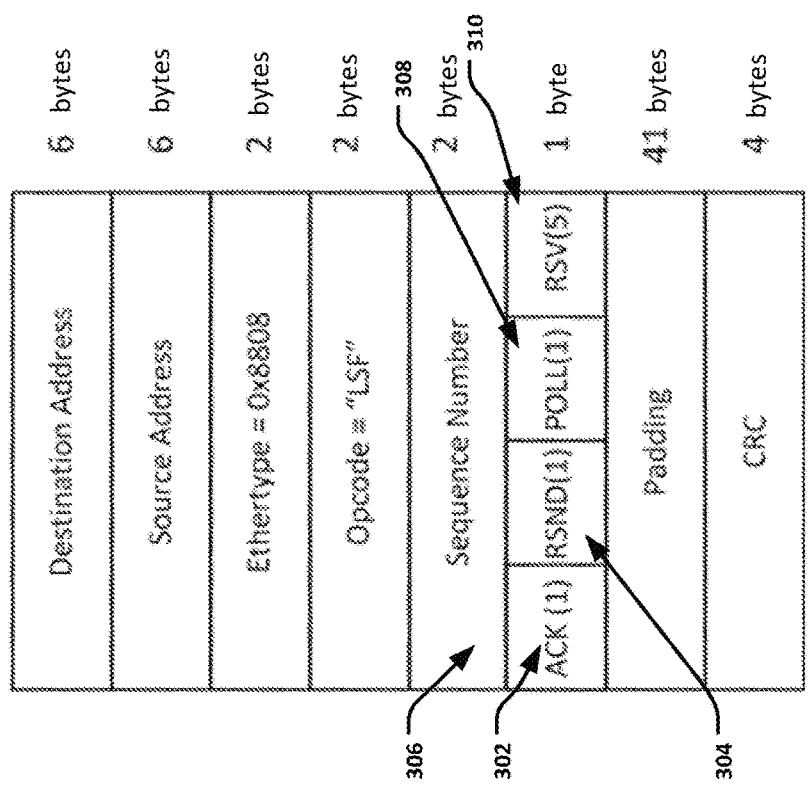
FIG. 3 illustrates a link status frame consistent with several embodiments of the present disclosure.

FIG. 3 illustrates a link status frame 300 consistent with several embodiments of the present disclosure. With continued reference to FIG. 1, the link status frame 300, in one embodiment, may be formatted as a MAC control frame that complies with, at least in part, an IEEE 802.3 MAC control frame. The frame 300 may be generated by the intermediate node 122 and/or end node 126 and sent to an intermediate node 122 and/or source node 102 in response to the Ethernet frame 200 (described above) from the sender node. Thus, frame 300 may be viewed as the "receiver node" frame format that is sent in response to frames from a sender node. The link status frame 300 includes an acknowledgement field (ACK) 302, a resend field (RSND) 304 and a sequence number field 306. The ACK field 302 may be used to set an acknowledgement flag to confirm that the frame (or sequence of frames) sent from the sender node were received correctly at the receiver node. The RSND field 304 may be used to identify a frame or frames within a sequence that were not properly received at the receiver node. The sequence number field 306 may be used by the receiving node to indicate the next received packet that is expected by the receiver, which may also serve as an indication that all previous packets are acknowledged as properly received.

In some embodiments, the POLL field 308 of the frame 300 may be used by a sender node to request that a receiving node send a link status frame. For example, if a sender has not received a link status frame within a certain time interval, the sender node can request for link status frame by sending the link status frame 300 with a set bit in the POLL field 308. The RSV field 310 may be a reserved field/bit for future use.

To provide retransmission capabilities, the error detection and retransmission module 118 is configured to allocate retransmit buffers 138. The size and/or number of the retransmit buffers 138 may be based on, for example the frame size and/or number of frames sent in a sequence. In some embodiments, the retransmit buffers 138 may be at least as large as the bandwidth delay product of the link, plus time to respond, to prevent buffer overflow errors, etc. In operation, and with continued reference to FIGS. 1-3, the sending node includes sequence number in the transmit packet. The sequence number is then used by the receiving node to acknowledge good frames or to send retransmission requests in case of frame errors. Frame errors may be detected by cyclic redundancy checks (CRC) or other link error detection mechanisms, and as may be defined by the aforementioned Ethernet communication protocols. While the retransmit buffers 138 are depicted in FIG. 1 as being part of system memory 108, in other embodiments, the retransmit buffers 138 may be allocated in other components/subcomponents of the source node 102, for example, in memory associated with network controller 104, cache memory, etc.

The transmitter (source node) is configured to maintain transmitted frames in the retransmit buffers 138 while waiting for receiver acknowledgement. The receiving node requests a retransmission if it does not receive frames in correct sequence or if it detects a frame check error (e.g., CRC error). The receiving node notifies the sending node of missing frames by requesting for retransmission of one or more frames, as may be indicated by setting the resend flag in the RSND field 304. The sequence number field indicates the frame number from which retransmission should begin, as an error may have occurred in that frame or in any subsequent frames. The receiving node may be configured to discard all frames after the error is detected, until the receiving node receives the frame with the correct sequence number as requested in the link status frame. The sending node retransmits frames from the sequence number as requested by the receiver in the exact order it was transmitted originally. Sequence number in the frame 300 indicates the next packet number expected by the receiver, and it also indicates that all previous packets (frames) are acknowledged (which is indicated by setting the ACK flag 302).

It should be understood that the frame structures of FIGS. 2 and 3 are only provided as examples of the types of structures that may be used to exchange link level status information. It is fully contemplated herein that other fields, data structures, frame types, etc. may be used to exchange link level status information without departing from the scope of the present disclosure. For example, link level status information may be exchanged using control or link status frames or by sending control codes within line encoding.

Figure 4:
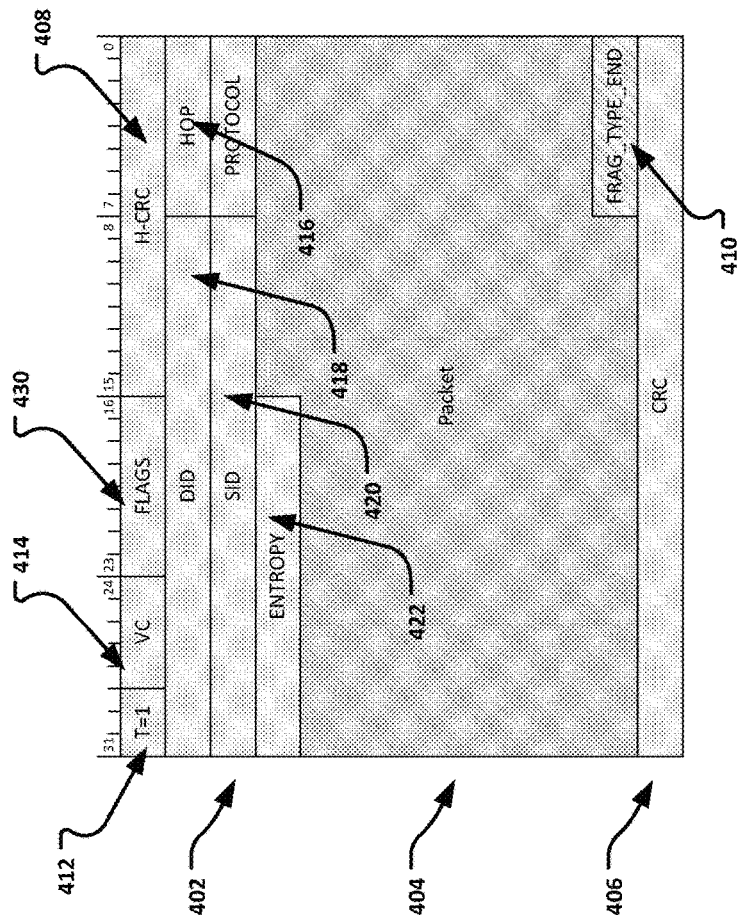
FIG. 4 illustrates an enhanced Ethernet frame consistent with several embodiments of the present disclosure.

Ib. Link-Level Error Detection and Retransmission Using "Enhanced Ethernet" Frame Formats FIG. 4 illustrates an enhanced Ethernet frame 400 consistent with several embodiments of the present disclosure. The enhanced Ethernet frame 400 may comply, or be compatible with, at least in part, the aforementioned Ethernet communications protocols and/or with derivations thereof. With continued reference to FIG. 1, the frame 400 may be generated by the source node 102 to forward one or more data packets to an intermediate node 122 and/or end node 126. Thus, frame 400 may be viewed as the "sender node" frame format. The frame 400 generally includes a header portion 402, a payload portion 404 and a cyclic redundancy check (CRC) portion 406. Pertinent to this embodiment, the header portion 402 includes a header CRC field (H-CRC) 408 that is also used to identify a sequence number of the frame 400. In one example, the CRC for the header field 402 may be calculated and then a sequence number is added. The sequence number is encoded in the H-CRC field 408, thus eliminating the need for a separate sequence number field (and therefore reducing the size of the frame 400 which may optimize the frame size for high performance networks). The H-CRC field 408 may be parsed by the receiving node to more quickly determine the sequence number, without having to parse the entire packet or the CRC field 406. This may allow the packet to be transmitted/forwarded without having to wait for the arrival of a final CRC. In some embodiments, the sequence number encoded in the H-CRC field 408 may be used to identify a single frame, and in other embodiments, the sequence number encoded in the H-CRC field 408 may be used to identify a series (e.g., sequence) of a set of frames (e.g., frames 11-20).

Figure 5:
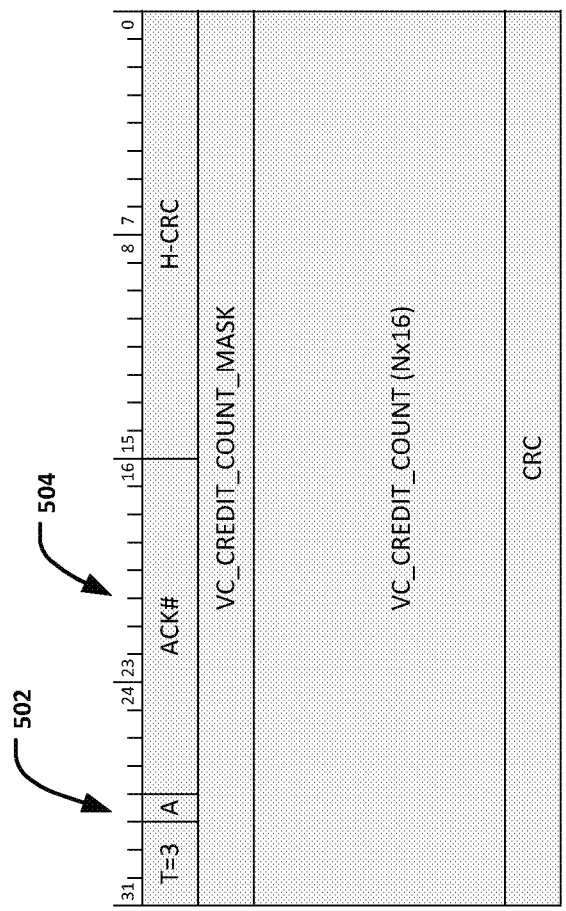
FIG. 5 illustrates an enhanced Ethernet control packet frame consistent with several embodiments of the present disclosure.

FIG. 5 illustrates an enhanced Ethernet control frame 500 consistent with several embodiments of the present disclosure. The control packet frame 500, in one embodiment, may be formatted as a MAC control frame that complies, or is compatible with, at least in part, the aforementioned Ethernet communications protocols and/or with derivations thereof. The frame 500 may be generated by the intermediate node 122 and/or end node 126 and sent to an intermediate node 122 and/or source node 102 in response to the Ethernet frame 400 (described above). Thus, frame 500 may be viewed as the "receiver node" frame format that is sent in response to frames from a sender node. The frame 500 includes a flag field (A) 502 and an acknowledgement field (ACK #) 504. The A field 502 may be used to set a flag bit to indicate whether the receiver is acknowledging a frame or sending a resend request back to the sender (e.g., A=1=ACK, A=0=Resend). The ACK field 302 may be used to send an acknowledgement number to confirm that the frame numbers identified by sequence number from the sender node were received correctly. The T field (for example, T=3) may be used to indicate that the frame 500 is an "enhanced" control frame.

To provide retransmission capabilities, the error detection and retransmission module 118 is configured to allocate retransmit buffers 138. The size of the retransmit buffers may be based on the frame size and/or number of frames sent in a sequence. In some embodiments, the retransmit buffer is at least as large as the bandwidth delay product of the link plus time to respond, to prevent buffer overflows, etc. In operation, and with continued reference to FIGS. 1 and 4-5, the sending node encodes a sequence number in the H-CRC field of the transmit packet. The H-CRC field is parsed by the receiving node and the sequence number is extracted to acknowledge good frames or to send retransmission requests in case of frames errors. (Frame errors are typically detected by CRC checks or other link error detection mechanisms).

The transmitter (source node) is configured to maintain all transmitted frames in a retransmit buffer waiting for receiver acknowledgement. The receiving node makes a request for retransmission if it does not receive frames in correct sequence or if it detects a frame check error. The receiving node notifies the sender of missing frames by requesting for retransmission of frames starting from a sequence number as indicated in the acknowledgement field (ACK #). The receiver discards all frames after the error is detected until it receives the frame with correct sequence number as requested in the control frame. The sending node retransmits frames from sequence number requested by receiver in the exact order it was transmitted originally. Sequence number in the frame 500 (set in acknowledgement field) indicates the next packet number expected by the receiver, and it also indicates that all previous packets (frames) are acknowledged (which is indicated by setting A=1 in flag 502).

It should be understood that the frame structures of FIGS. 4 and 5 are only provided as examples of the types of structures that may be used to exchange link level status information. It is fully contemplated herein that other fields, data structures, frame types, etc. may be used to exchange link level status information without departing from the scope of the present disclosure. For example, link level status information may be exchanged using control or link status frames or by sending control codes within line encoding.

II. Frame Pre-Emption Using "Enhanced Ethernet" Frame Formats

Figure 6:
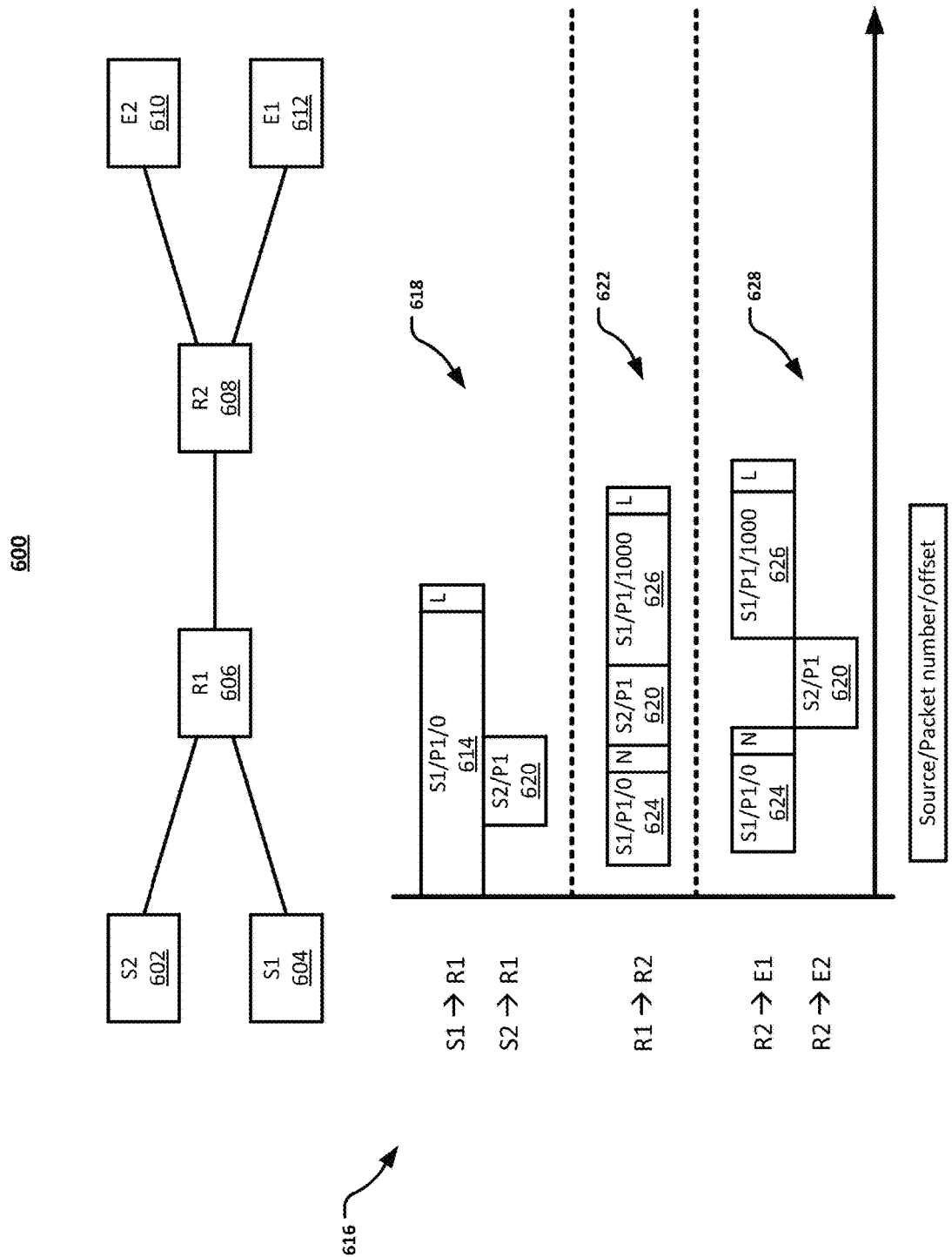
FIG. 6 illustrates a general overview of frame preemption consistent with several embodiments of the present disclosure.

FIG. 6 illustrates a general overview 600 of frame preemption consistent with several embodiments of the present disclosure. FIG. 6 illustrates several hops of a network topology 600 that includes two sending nodes: 602 (S2) and 604 (S1), two intermediate nodes: 606 (R1) and 608 (R2), and two end nodes: 610 (E2) and 612 (E1). A timing diagram 616 illustrates the timing of various operations for frame preemption. For this example, assume that sending node S1 is sending a low-priority frame 614 to E1, via R1 and R2 during time period 618; and that during transmission of the low priority frame 614, a high priority frame 620 is generated by S2 destined for E2 via R1 and R2. The frames are labeled with the source/packet number/offset in the figures. So, for example, frame 614 is designated "S1/P1/0." An "L" tag at the end of the frame is used to indicate that it is the last (or only) fragment of the frame. The tag may be part of a FRAG_TYPE_END field (e.g., 410, 904) as described further below. As illustrated at 622, and with continued reference to FIG. 1, the frame preemption module 116 of R1 is configured to interrupt the transmission of the low priority frame 614 from S1, send the high priority frame 620 from S2 to R2 and restart transmission of the low priority frame 614. The low priority frame 614 is segmented into two frames, noted by reference numbers 624 and 626. As illustrated at 628, R2 sends the first segment or fragment of the low priority frame 624 to E1, then the high priority frame 620 to E2, followed by the second segment of low priority frame 626 to E1. On the receiving end, E1 is configured to merge the two frame segments 624 and 626, as will be explained in greater detail below. Frame segment 624 has an "N" tag at the end of the frame to indicate that it is not the last fragment of the frame. The tag may be, for example, in field 410 or 904. Frame segment 626 has an offset of 1000, in this example, to indicate an offset of 1000 bytes for use during the merger/reconstruction of the frame segments at the receiving node (e.g., R1, R2, E1 or E2 as appropriate).

Figure 7:
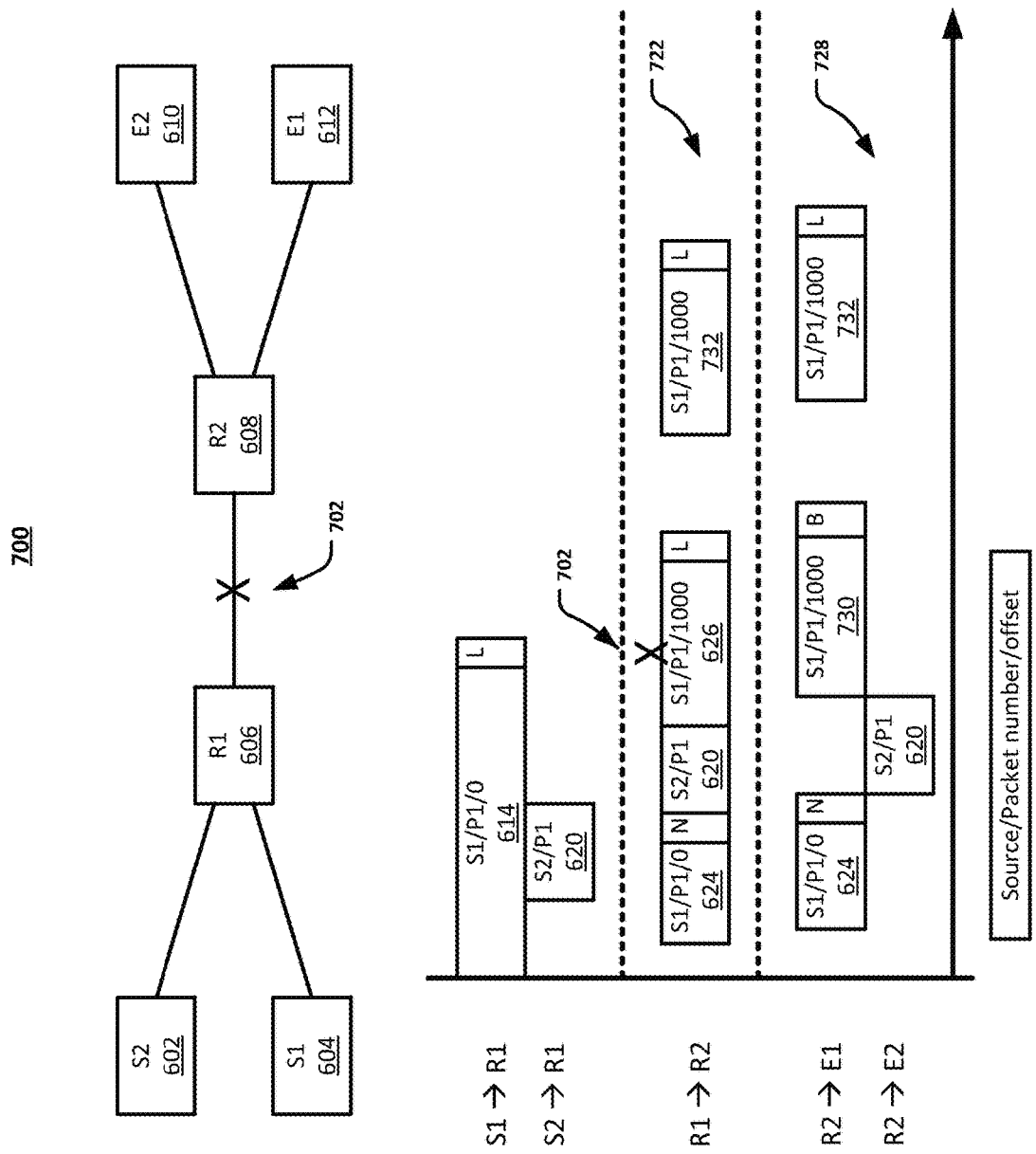
FIG. 7 illustrates an example of frame preemption and link level error detection and retransmission of the network topology of FIG. 6.

FIG. 7 illustrates an example 700 of frame preemption and link level error detection and retransmission of the network topology of FIG. 6. In this example, assume that a transmission error 702 occurred between R1 and R2 for the second fragment 626 of the low priority packet, during time period 722. The second fragment, with error, may be passed on as fragment 730 with a "B" tag at the end of the frame to indicate that the frame is bad. The tag may be, for example, in field 410 or 904. The second fragment may later be resent correctly as 732 from R1 to R2, and again from R2 to E1, during time period 728.

Figure 8:
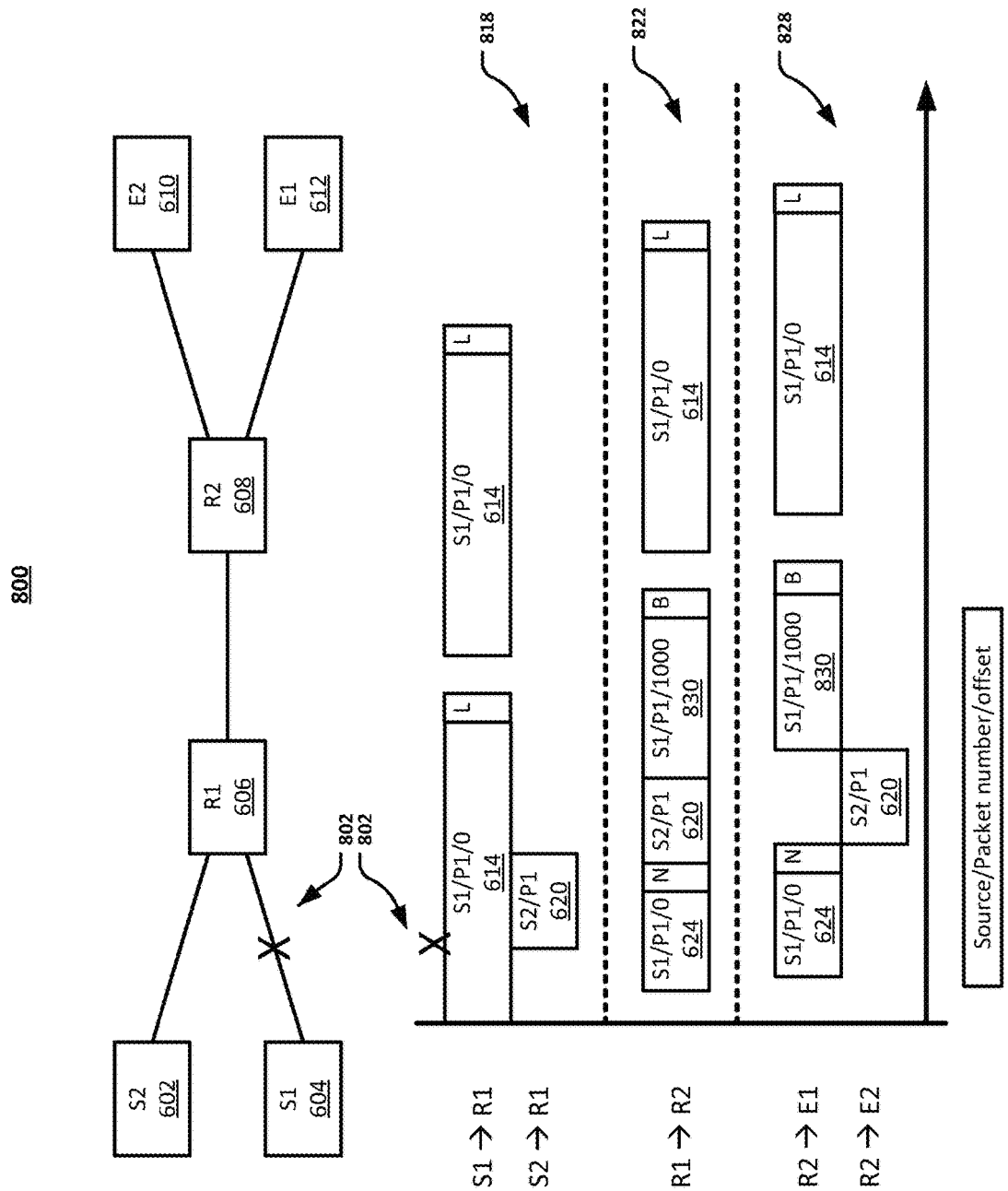
FIG. 8 illustrates another example of frame preemption and link level error detection and retransmission of the network topology of FIG. 6.

FIG. 8 illustrates another example 800 of frame preemption and link level error detection and retransmission of the network topology of FIG. 6. In this example, assume that a transmission error 802 occurred between S1 and R1 for the low priority packet 614, during time period 818. The low priority packet is resent from S1 to R1, during time period 818, and again from R1 to R2 during time period 822, and again from R2 to E1, during time period 828.

To interrupt transmission of a low priority packet, and referring again to the enhanced Ethernet frame of FIG. 4, the frame 400 includes a FRAG-TYPE-END field 410 that may be used to indicate if the frame is fragmented and a fragment type field 412. Since, at the beginning of transmission of a low priority packet, it is not known if the low priority packet will be interrupted by a high priority packet, the fragment type field 412 may be set to an arbitrary, initial value, e.g., T=1, to indicate that the frame 400 is a first fragment of multiple fragments. Subsequent frames may be numbered sequentially from the initial value. If the low priority packet is fragmented, the field 410 may be used to indicate that the current frame is not the end of the packet and the current packet is a fragmented portion of at least one other fragment. On the receiving end, these fields may be parsed to determine the values contained therein. The high priority packet may be formatted using the enhanced frame 400 of FIG. 4. The flags field 430 may be used to indicate whether or not the packet is preempt-able, or in other words, whether or not the frame may be fragmented.

Figure 9:
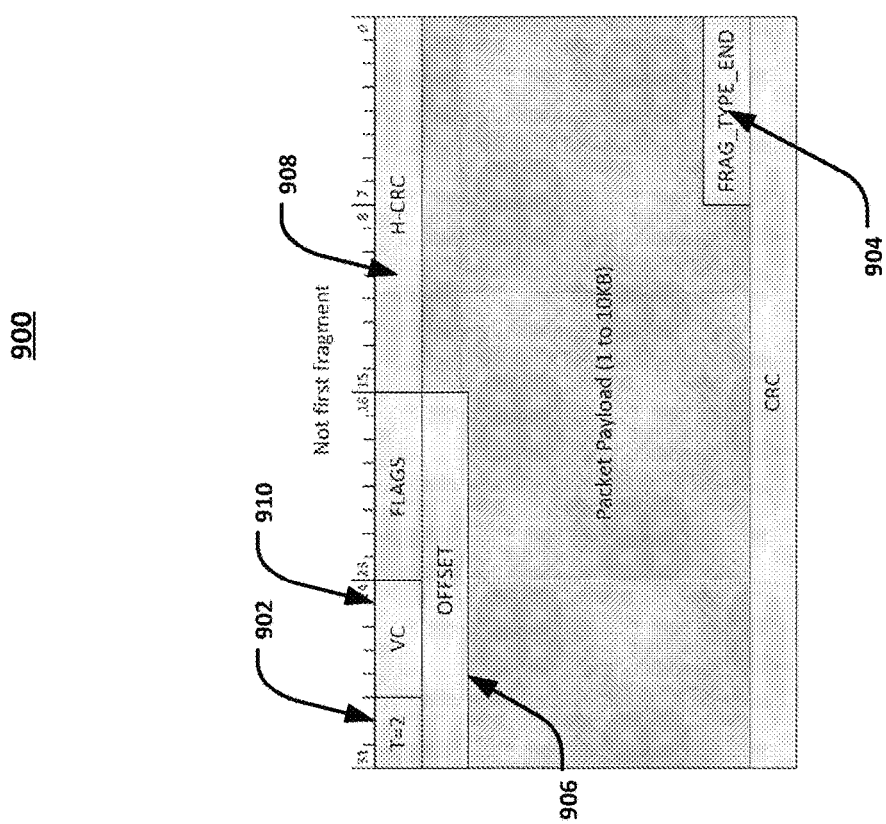
FIG. 9 illustrates an enhanced Ethernet frame for preemption of second and subsequent fragmented frames consistent with several embodiments of the present disclosure.

FIG. 9 illustrates an enhanced Ethernet frame 900 for second and subsequent fragmented frames. The frame 900 includes a fragment type field 902, a FRAG_TYPE_END field 904 and an offset field 906. The fragment type field 902 may be set to a value other than the initial value of the frame 400, for example, the fragment type field may be incremented from the initial value, e.g., T=2. The FRAG_TYPE_END field 904 may be used to indicate if this frame 900 is the last fragmented frame and/or if there are additional fragments of the original frame to be sent. The offset field 906 may be used to determine the start of the second (or subsequent) frame fragment relative to a previous frame fragment, therefore providing end-to-end transmission capabilities for fragmented frames. The offset field 906 may be used at the receiver to ensure that fragments are reassembled in the proper order and/or to determine transmission errors. In some embodiments, each hop in the network topology may be configured to maintain a context per port and/or per virtual channel (traffic class) so that frames are forwarded properly from each hop.

In operation, and referring again to FIG. 1, the frame preemption module 116 may be configured to generate the frames 400 and 900 of FIGS. 4 and 9, respectively, to fragment a low priority frame into two or more fragments thus allowing transmission of a high priority frame without waiting for completion of the low priority frame. The terms "low" and "high" in the context of priority may be established based on, for example, QoS considerations, virtual channels (traffic classes), priority fields, and/or other mechanisms that may be used to distinguish different requirements of frames.

III. Cut-Through Forwarding Using "Enhanced Ethernet" Frame Formats

Conventional Ethernet devices use store and forwarding operations to enable frame transmission from hop to hop. These store and forwarding operations require that the entire frame be stored in the device before that device can begin forwarding the frame to the next hop. In the present disclosure, the frames may be enabled to allow a receiving device to parse just the header portion (or a specific field in the header portion) to determine if the header information is correct, and thus allowing a node to begin forwarding the header and payload to the next hop before the entire frame has been received (cut-through forwarding). Referring again to the enhanced Ethernet frame of FIG. 4, the H-CRC field 408 may be used as a general calculation of CRC for the header portion 402. Parsing the H-CRC field 408 may enable the receiving node to quickly determine frame header integrity (e.g., that the destination and/or source identification information are correct), and enable the receiving node to start sending the frame 400 to the next hop before the entirety of the frame 400 has been received. If the frame has been fragmented, the frame format 900 of FIG. 9 may be used, and the H-CRC field 902 may be used in a similar manner.

Although the H-CRC field 408 is shown in this embodiment as associated with "enhanced" Ethernet frames (e.g. 400), this concept can also be equally applied with Ethernet 802.3 compatible frame format 200 with HPC header 202 as illustrated in FIG. 2. For the frame 200, an H-CRC field may be included in the header 204 (not shown) that will perform the similar function as header 408 of FIG. 4. Thus, a receiving node with cut through forwarding capability can start forwarding the frame as soon as it receives the header 204 and the header integrity check passes.

In operation, and referring again to FIG. 1, the cut-through forwarding module 128 may be configured to generate the H-CRC fields 408 and 908 of frames 400 and 900 of FIGS. 4 and 9, respectively, to enable cut-through forwarding at the next hop (e.g., the next intermediate node). Referring again to FIG. 6, the concepts of cut-through forwarding are also illustrated. For example, at timing period 622, R1 begins forwarding the first fragment 624 of the low priority packet 614 to R2 before the entirety of the low priority packet 614 is transmitted from S1 to R1. Similar operations occur at timing period 628.

IVa. Deadlock Avoidance Using IEEE 802.3-Compatible Frame Formats

Figure 10:
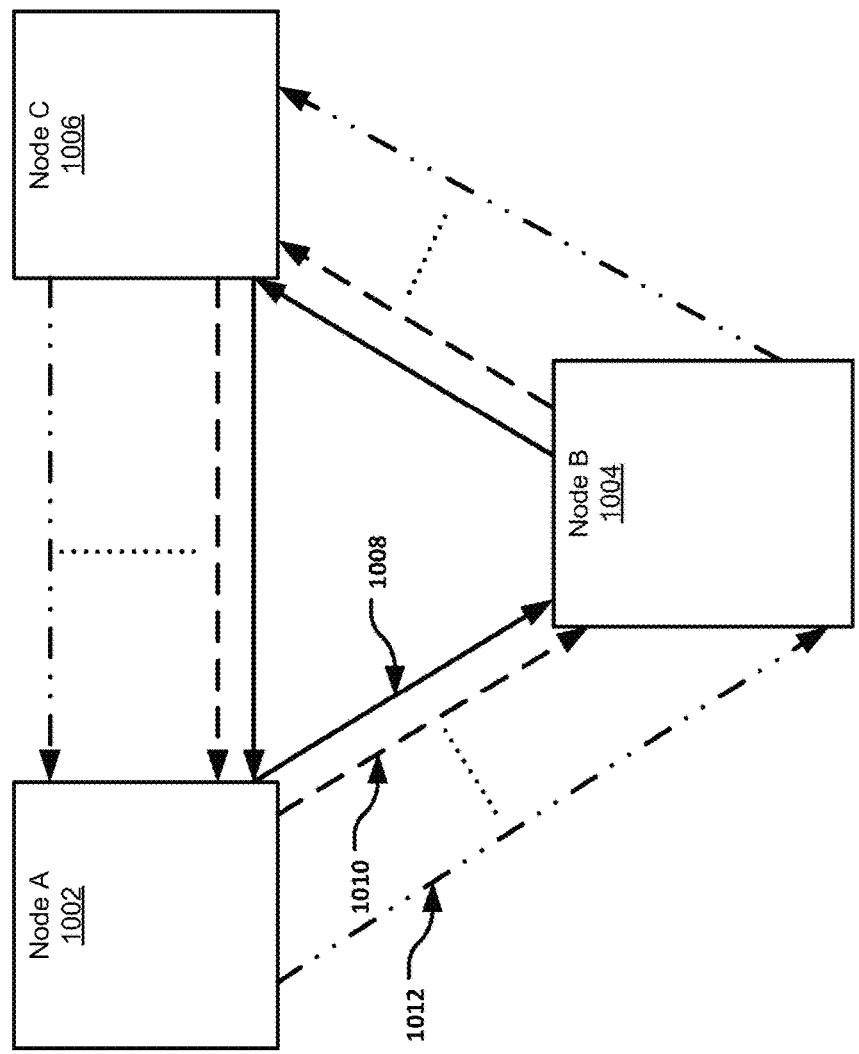
FIG. 10 illustrates a general overview of deadlock avoidance consistent with several embodiments of the present disclosure.

FIG. 10 illustrates a general overview of deadlock avoidance consistent with several embodiments of the present disclosure. The network topology 1000 of FIG. 10 includes, for ease of understanding, node A 1002, node B 1004 and node C 1006 in communication with each other. In conventional Ethernet protocols, a single channel 1008 is defined between the nodes for packet communication. A deadlock may occur on the single channel 1008 if the buffers of a receiving station (e.g., node B 1004) are full. This may cause node B to notify node A to stop sending frames, while node C continues to send frames to node A. This may cause the buffers of node A to become full, thus causing node A to notify node C to stop sending frames. In the present disclosure, a plurality of virtual channels (traffic classes) 1008, 1010, . . . , 1012 may be provided to resolve deadlock issues.

To enable a plurality of virtual channels, and referring again to FIG. 2, the Ethernet frame 200 may include a user priority (PRI) field 212 to set the frame as belonging to a selected traffic class, and a hop count field 214 to provide an expiration mechanism for the frame 200. This field is also called as Priority code point (PCP) as defined by the IEEE 802.1Q standard. Under the current IEEE 802.1Q standard, the user priority or PCP field is used for transmission selection or scheduling using different transmission selection algorithms. This field is also used in priority based flow control. In addition to the standard transmission selection or flow control mechanisms, in the present disclosure the User PRI (or PCP) field 212 may be used to represent virtual channels when used in high performance interconnects. The virtual channel mechanism is used to avoid deadlocks in lossless networks that have inherent cyclic dependency like the one shown in FIG. 10.

In one example, the value of the hop count field 214 may be decremented at each hop in the network, and when the value of the hop count field 214 reaches a predetermined value (e.g., 0), the packet may be expired, or the frame may be reclassified in a new virtual channel via the user PRI field 212. Thus, the frame 200 may be "moved" to a different virtual channel 1008, 1010, . . . , 1012, thus avoiding a deadlock on a given channel. In other embodiments, upon expiration of a frame, the frame can be removed from a given traffic class and/or dropped entirely.

In operation, and referring again to FIG. 1 with continued reference to FIG. 10, the deadlock management module 130 may be configured to divide the link between the nodes A, B and C into multiple virtual channels 1008, 1010, . . . , 1012. The deadlock management module 130 may be configured to generate frame 200 including fields 212 and 214 to provide a mechanism for a node to switch channels for a given frame, thus enabling deadlock avoidance.

IVb. Deadlock Avoidance Using "Enhanced Ethernet" Frame Formats

Referring again the enhanced Ethernet frame of FIG. 4, and with continued reference to FIGS. 1 and 10, the frame 400 may include a virtual channel (VC) field 414 to set the frame as belonging to a selected virtual channel or traffic class, and a hop field 416 to provide an expiration mechanism for the frame 400. In one example, the value of the hop field 416 may be decremented at each hop in the network, and when the value of the hop field 416 reaches a predetermined value (e.g., 0), the packet may be expired, or the frame may be reclassified in a new virtual channel via the VC field 414. Thus, the frame 400 may be "moved" to a different virtual channel 1008, 1010, . . . , 1012, thus avoiding a deadlock on a given channel. If the frame has been fragmented, the frame format 900 of FIG. 9 may be used for second and subsequent fragments, and the VC field 910 may be used in a similar manner. The forwarding information and HOP fields may be only present in the first fragmented frame, in the case where only one outstanding fragment context is allowed per virtual channel. So the second and subsequent frames in a fragmented frame in that virtual channel may follow the same path as first frame. Therefore, if the first frame was removed from a virtual channel and moved to a different virtual channel (or dropped in extreme cases) when the hop count expired, then second and subsequent fragmented frames in that virtual channel will follow the same path as the first fragmented frame.

Thus, there is no need to repeat this information in each of subsequent fragmented frames, and hence the Type=2 frames do not carry the forwarding information such as DID, SID, protocol, and HOP fields. This may be performed as an optimization to conserve frame overhead due to fragmentation).

In operation, and referring again to FIG. 1 with continued reference to FIG. 10, the deadlock management module 130 may be configured to divide the link between the nodes A, B and C into multiple virtual channels 1008, 1010, . . . , 1012. The deadlock management module 130 also may be configured to generate frames 400 and/or 900 of FIGS. 4 and 9, respectively, to provide a mechanism for a node to switch channels for a given frame, thus enabling deadlock avoidance.

V. Frame Overhead Management Using "Enhanced Ethernet" Frame Formats

Figure 11:
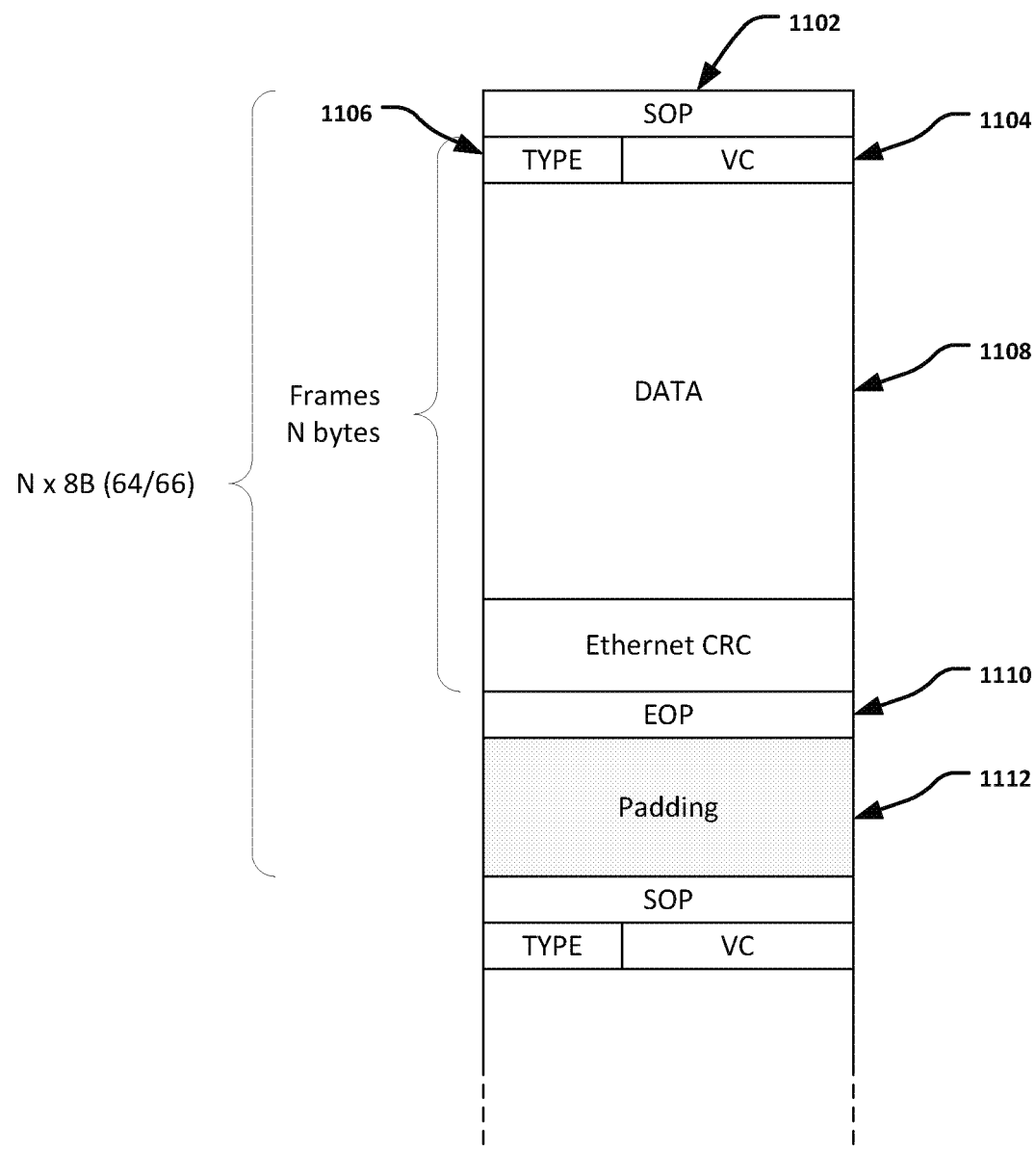
FIG. 11 illustrates an enhanced Ethernet frame format for frame overhead optimization consistent with several embodiments of the present disclosure.

FIG. 11 illustrates an enhanced Ethernet frame format 1100 for frame overhead optimization consistent with several embodiments of the present disclosure. In particular, the frame format 1100 of FIG. 11 generally illustrates the outer envelope of the enhanced Ethernet frame 400 (or 900) of FIG. 4. In this embodiment, conventional preamble, start-of-frame delimiter and inter-packet gap (IPG) are eliminated, thus providing a frame format that requires less overhead compared to a conventional Ethernet frame. The frame 1100 may be generally aligned with a given encoding/decoding scheme, e.g., 64B/66B encoding/decoding. The frame includes a start of packet field 1102, an enhanced header portion 1104, a payload portion 1108, an end of packet field 1110, and in some embodiments, a padding field 1112. Using the 64B/66B encoding/decoding scheme as an example, if the EOP field 1110 does not occur at a 64 bit boundary, the padding portion 1112 may be used to pad the frame up to the specified encoding scheme (so for example, in the case of 64B/66B encoding/decoding scheme the padding ensures that the SOP always starts at 64-bit boundary).

VIa. Forwarding Optimization Using IEEE 802.3-Compatible Frame Formats

Conventional Ethernet devices use MAC address (layer 2), IP address (layer 3) and/or IP plus TCP/UDP port numbers (layer 4) for flow forwarding operations. These forwarding operations require that the entire header is parsed at each hop to determine the proper flow for the packet. In the present disclosure, the frames may be enabled to provide end-to-end and hop-by-hop header fields for efficient forwarding in hardware for high performance fabric applications.

Referring again to FIG. 2, the additional header portion 204 may include a destination ID field 220, a source ID field 224, and a flow entropy field 216 to provide forwarding optimization. The destination ID field 220 may identify a destination node for the frame 200, the source ID field 224 may provide a source node of the frame 200, and the flow entropy field 216 may provide a specified path through the network fabric. The flow entropy field 216 may be generated, for example, by forwarding optimization module 136. The enhanced header provides all the necessary fields for forwarding, cut-through, traffic differentiation, QoS, fragmentation, link level retry. So it is possible to implement intermediate nodes just based on the enhanced Ethernet header and need not implement the traditional Ethernet forwarding mechanisms like MAC address, IP address, TCP/UDP port numbers, etc. The fabric nodes at the edge act as bridge or gateway between standard Ethernet and Enhanced Ethernet links and hence need to implement both Enhanced Ethernet and standard Ethernet based forwarding and frame formats.

VIb. Forwarding Optimization Using "Enhanced Ethernet" Frame Formats

Similar to previous embodiment, and referring again to FIG. 4, the header portion 402 may include a destination ID (DID) field 418, a source ID (SID) field 420, and an entropy field 422 to provide forwarding optimization. The DID field 418 may identify a destination node for the frame 400, the SID field 420 may provide a source node of the frame 400, and the entropy field 422 may provide a specified path through the network fabric. The enhanced header provides all the necessary fields for forwarding, cut-through, traffic differentiation, QoS, fragmentation, link level retry. So it is possible to implement intermediate nodes just based on the enhanced Ethernet header and need not implement the traditional Ethernet forwarding mechanisms like MAC address, IP address, TCP/UDP port numbers, etc. The fabric nodes at the edge act as bridge or gateway between standard Ethernet and Enhanced Ethernet links and hence need to implement both Enhanced Ethernet and standard Ethernet based forwarding and frame formats.

FIG. 12 illustrates a flowchart of operations 1200 of one example embodiment consistent with the present disclosure. The operations provide a method for providing enhanced Ethernet communication. At operation 1210, a first Ethernet frame is transmitted to a network node. The first Ethernet frame includes a field for specifying a sequence number associated with said frame. At operation 1220, a status frame is received. The status frame includes a field for specifying transmission status of the first Ethernet frame and a field for specifying the sequence number associated with the first Ethernet frame, wherein the transmission status indicates success or failure. At operation 1230, the first Ethernet frame is re-transmitted to the node in response to detection of the transmission status as failure.

The foregoing includes example system architectures and methodologies. Modifications to the present disclosure are possible. The host processor 106 may include one or more processor cores and may be configured to execute system software. System software may include, for example, operating system code (e.g., OS kernel code) and local area network (LAN) driver code. LAN driver code may be configured to control, at least in part, the operation of the network controller 104. System memory may include I/O memory buffers configured to store one or more data packets that are to be transmitted by, or received by, network controller 104. Chipset circuitry may generally include "North Bridge" circuitry (not shown) to control communication between the processor, network controller 104 and system memory 108.

Node 102 and/or link partner 122 or 126 may further include an operating system (OS, not shown) to manage system resources and control tasks that are run on, e.g., node 102. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised of a dedicated subsystem such as, for example, a TCP offload engine and/or network controller 104. The TCP offload engine circuitry may be configured to provide, for example, packet transport, packet segmentation, packet reassembly, error checking, transmission acknowledgements, transmission retries, etc., without the need for host CPU and/or software involvement.

The system memory 108 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more tangible computer readable storage mediums having stored thereon, individually or in combination, instructions that when executed by one or more processors perform the methods. The processor may include, for example, a processing unit and/or programmable circuitry in the network controller 104, system processor 106 and/or other processing unit or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage device suitable for storing electronic instructions.

"Module," as used herein, may comprise, singly or in any combination circuitry and/or code and/or instructions sets (e.g., software, firmware, etc.). "Circuitry," as used in any embodiment herein, may comprise, for example, singly or in any combination, hardwired circuitry, programmable circuitry, state machine circuitry, and/or firmware that stores instructions executed by programmable circuitry. The circuitry may be embodied as an integrated circuit, such as an integrated circuit chip. Thus, the network controller may be embodied as a stand-alone integrated circuit or may be incorporated as one of several components on an integrated circuit. In some embodiments, the various components, circuits and modules of the network controller or other systems may be combined in a system-on-a-chip (SoC) architecture.

Thus, the present disclosure provides systems, devices, methods and computer readable media for enabling enhanced Ethernet network communications. The following examples pertain to further embodiments.

According to Example 1 there is provided a network controller to communicate with a network node. The network controller may include a transmitter circuit to transmit an Ethernet frame to the node, the Ethernet frame including a field for specifying a sequence number associated with the Ethernet frame; a receiver circuit to receive a status frame including a field for specifying transmission status of the Ethernet frame and a field for specifying the sequence number associated with the Ethernet frame, and the transmission status to indicate success or failure; and an error detection and retransmission module to retransmit the Ethernet frame to the node in response to detection of the transmission status as failure.

Example 2 may include the elements of the foregoing example, further including a retransmission buffer to store the transmitted Ethernet frame until the received status frame indicates transmission status as success.

Example 3 may include the elements of the foregoing example, and the transmitter circuit module is further to transmit a request to the node to trigger the node to transmit the status frame.

Example 4 may include the elements of the foregoing example, and the status frame is an Ethernet Media Access Control frame including an acknowledgement field to indicate transmission success and a resend field to indicate transmission failure.

Example 5 may include the elements of the foregoing example, and the network controller is incorporated in an end network node element or an intermediate network node element.

Example 6 may include the elements of the foregoing example, and the Ethernet frame includes a Checksum (CRC) and the transmission status is based on the CRC.

Example 7 may include the elements of the foregoing example, and the Ethernet frame includes a header field and the sequence number is encoded in a header CRC in the header field.

According to Example 8 there is provided a method for enhanced Ethernet communication. The method may include transmitting a first Ethernet frame to a network node, the first Ethernet frame including a field for specifying a sequence number associated with the first Ethernet frame; receiving a status frame including a field for specifying transmission status of the first Ethernet frame and a field for specifying the sequence number associated with the first Ethernet frame, and the transmission status to indicate success or failure; and retransmitting the first Ethernet frame to the node in response to detection of the transmission status as failure.

Example 9 may include the elements of the foregoing example, further including transmitting a request to the node to trigger the node to transmit the status frame.

Example 10 may include the elements of the foregoing example, and the status frame is an Ethernet Media Access Control frame including an acknowledgement field to indicate transmission success and a resend field to indicate transmission failure.

Example 11 may include the elements of the foregoing example, and the method is performed by an end network node element or an intermediate network node element.

Example 12 may include the elements of the foregoing example, and the Ethernet frame includes a Checksum (CRC) and the transmission status is based on the CRC.

Example 13 may include the elements of the foregoing example, and the first Ethernet frame includes a header field and the sequence number is encoded in a header CRC in the header field.

According to Example 14 there is provided at least one computer-readable storage medium having instructions stored thereon which when executed by a processor result in the following operations for enhanced Ethernet communication, including: transmitting a first Ethernet frame to a network node, the first Ethernet frame including a field for specifying a sequence number associated with the first Ethernet frame; receiving a status frame including a field for specifying transmission status of the first Ethernet frame and a field for specifying the sequence number associated with the first Ethernet frame, and the transmission status to indicate success or failure; and retransmitting the first Ethernet frame to the node in response to detection of the transmission status as failure.

Example 15 may include the elements of the foregoing example, further including the operation of transmitting a request to the node to trigger the node to transmit the status frame.

Example 16 may include the elements of the foregoing example, and the status frame is an Ethernet Media Access Control frame including an acknowledgement field to indicate transmission success and a resend field to indicate transmission failure.

Example 17 may include the elements of the foregoing example, and the operations are performed by an end network node element or an intermediate network node element.

Example 18 may include the elements of the foregoing example, and the Ethernet frame includes a Checksum (CRC) and the transmission status is based on the CRC.

Example 19 may include the elements of the foregoing example, and the first Ethernet frame includes a header field and the sequence number is encoded in a header CRC in the header field.

According to Example 20 there is provided a system for enhanced Ethernet communication. The system may include means for transmitting a first Ethernet frame to a network node, the first Ethernet frame including a field for specifying a sequence number associated with the first Ethernet frame; means for receiving a status frame including a field for specifying transmission status of the first Ethernet frame and a field for specifying the sequence number associated with the first Ethernet frame, and the transmission status to indicate success or failure; and means for retransmitting the first Ethernet frame to the node in response to detection of the transmission status as failure.

Example 21 may include the elements of the foregoing example, further including means for transmitting a request to the node to trigger the node to transmit the status frame.

Example 22 may include the elements of the foregoing example, and the status frame is an Ethernet Media Access Control frame including an acknowledgement field to indicate transmission success and a resend field to indicate transmission failure.

Example 23 may include the elements of the foregoing example, and the system is an end network node element or an intermediate network node element.

Example 24 may include the elements of the foregoing example, and the Ethernet frame includes a Checksum (CRC) and the transmission status is based on the CRC.

Example 25 may include the elements of the foregoing example, and the first Ethernet frame includes a header field and the sequence number is encoded in a header CRC in the header field.

According to Example 26 there is provided a network controller to communicate with a network node. The network controller may include a transmitter circuit to transmit a first Ethernet frame to the network node; a frame preemption module to interrupt transmission of the first frame to transmit a second Ethernet frame, and the second frame has a higher priority than the first frame; and the frame preemption module further to re-start transmission of a remaining fragment of the first frame.

Example 27 may include the elements of the foregoing example, and the first Ethernet frame includes an end-of-frame field to indicate that the frame is a final fragment.

Example 28 may include the elements of the foregoing example, and the first Ethernet frame includes an offset field to indicate a start of the frame relative to a previous frame fragment.

Example 29 may include the elements of the foregoing example, and the first Ethernet frame further includes a fragment tag field to indicate an error status associated with the frame, and the offset field and the fragment tag field are provided to a receiver of the network node for reassembly of the first Ethernet frame.

Example 30 may include the elements of the foregoing example, and the priority of the first and second frames are based on a Quality of Service (QoS) field, a traffic class field, a virtual channel field or a priority field in each of the frames.

Example 31 may include the elements of the foregoing example, and the network controller is incorporated in an end network node element or an intermediate network node element.

According to Example 32 there is provided a method for enhanced Ethernet communication. The method may include transmitting a first Ethernet frame to a network node; interrupting transmission of the first frame to transmit a second Ethernet frame, and the second frame has a higher priority than the first frame; and re-starting transmission of a remaining fragment of the first frame.

Example 33 may include the elements of the foregoing example, further including including an end-of-frame field in the first Ethernet frame to indicate that the frame is a final fragment.

Example 34 may include the elements of the foregoing example, further including including an offset field in the first Ethernet frame to indicate a start of the frame relative to a previous frame fragment.

Example 35 may include the elements of the foregoing example, and the first Ethernet frame further includes a fragment tag field to indicate an error status associated with the frame.

Example 36 may include the elements of the foregoing example, further including reassembling the first Ethernet frame based on the offset field and the fragment tag field.

Example 37 may include the elements of the foregoing example, further including determining the priority of the first and second frames based on a Quality of Service (QoS) field, a traffic class field, a virtual channel field or a priority field in each of the frames.

Example 38 may include the elements of the foregoing example, and the method is performed by an end network node element or an intermediate network node element.

According to Example 39 there is provided at least one computer-readable storage medium having instructions stored thereon which when executed by a processor result in the following operations for enhanced Ethernet communication, including: transmitting a first Ethernet frame to a network node; interrupting transmission of the first frame to transmit a second Ethernet frame, and the second frame has a higher priority than the first frame; and re-starting transmission of a remaining fragment of the first frame.

Example 40 may include the elements of the foregoing example, further including the operation of including an end-of-frame field in the first Ethernet frame to indicate that the frame is a final fragment.

Example 41 may include the elements of the foregoing example, further including the operation of including an offset field in the first Ethernet frame to indicate a start of the frame relative to a previous frame fragment.

Example 42 may include the elements of the foregoing example, and the first Ethernet frame further includes a fragment tag field to indicate an error status associated with the frame.

Example 43 may include the elements of the foregoing example, further including the operation of reassembling the first Ethernet frame based on the offset field and the fragment tag field.

Example 44 may include the elements of the foregoing example, further including the operation of determining the priority of the first and second frames based on a Quality of Service (QoS) field, a traffic class field, a virtual channel field or a priority field in each of the frames.

Example 45 may include the elements of the foregoing example, and the operations are performed by an end network node element or an intermediate network node element.

According to Example 46 there is provided a system for enhanced Ethernet communication. The system may include means for transmitting a first Ethernet frame to a network node; means for interrupting transmission of the first frame to transmit a second Ethernet frame, and the second frame has a higher priority than the first frame; and means for re-starting transmission of a remaining fragment of the first frame.

Example 47 may include the elements of the foregoing example, further including means for including an end-of-frame field in the first Ethernet frame to indicate that the frame is a final fragment.

Example 48 may include the elements of the foregoing example, further including means for including an offset field in the first Ethernet frame to indicate a start of the frame relative to a previous frame fragment.

Example 49 may include the elements of the foregoing example, and the first Ethernet frame further includes a fragment tag field to indicate an error status associated with the frame.

Example 50 may include the elements of the foregoing example, further including means for reassembling the first Ethernet frame based on the offset field and the fragment tag field.

Example 51 may include the elements of the foregoing example, further including means for determining the priority of the first and second frames based on a Quality of Service (QoS) field, a traffic class field, a virtual channel field or a priority field in each of the frames.

Example 52 may include the elements of the foregoing example, and the system is an end network node element or an intermediate network node element.

According to Example 53 there is provided a network controller to communicate with a network node. The network controller may include a receiver circuit to receive at least a portion of an Ethernet frame, the portion including a header field and at least a portion of a payload field; a cut-through forwarding module to verify a checksum (CRC) from the header field to determine validity of the header field prior to receipt of entirety of the frame; and a transmitter circuit to forward the portion of the frame to the network node if the header field is valid.

Example 54 may include the elements of the foregoing example, and the cut-through forwarding module is further to verify a source address and a destination address of the header field to determine validity of the header field.

Example 55 may include the elements of the foregoing example, and a sequence number associated with the frame is encoded in the CRC.

Example 56 may include the elements of the foregoing example, and the network controller is incorporated in an intermediate network node element.

According to Example 57 there is provided a method for enhanced Ethernet communication. The method may include receiving at least a portion of an Ethernet frame, the portion including a header field and at least a portion of a payload field; verifying a checksum (CRC) from the header field to determine validity of the header field prior to receipt of entirety of the frame; and forwarding the portion of the frame to a network node if the header field is valid.

Example 58 may include the elements of the foregoing example, further including verifying a source address and a destination address of the header field to determine validity of the header field.

Example 59 may include the elements of the foregoing example, further including encoding a sequence number associated with the frame in the CRC.

Example 60 may include the elements of the foregoing example, and the method is performed by an intermediate network node element.

According to Example 61 there is provided at least one computer-readable storage medium having instructions stored thereon which when executed by a processor result in the following operations for enhanced Ethernet communication, including: receiving at least a portion of an Ethernet frame, the portion including a header field and at least a portion of a payload field; verifying a checksum (CRC) from the header field to determine validity of the header field prior to receipt of entirety of the frame; and forwarding the portion of the frame to a network node if the header field is valid.

Example 62 may include the elements of the foregoing example, further including the operation of verifying a source address and a destination address of the header field to determine validity of the header field.

Example 63 may include the elements of the foregoing example, further including the operation of encoding a sequence number associated with the frame in the CRC.

Example 64 may include the elements of the foregoing example, and the operations are performed by an intermediate network node element.

According to Example 65 there is provided a system for enhanced Ethernet communication. The system may include means for receiving at least a portion of an Ethernet frame, the portion including a header field and at least a portion of a payload field; means for verifying a checksum (CRC) from the header field to determine validity of the header field prior to receipt of entirety of the frame; and means for forwarding the portion of the frame to a network node if the header field is valid.

Example 66 may include the elements of the foregoing example, further including means for verifying a source address and a destination address of the header field to determine validity of the header field.

Example 67 may include the elements of the foregoing example, further including means for encoding a sequence number associated with the frame in the CRC.

Example 68 may include the elements of the foregoing example, and the system is an intermediate network node element.

According to Example 69 there is provided a network controller to communicate with a network node. The network controller may include a receiver circuit to receive at least a portion of an Ethernet frame, the portion including a header field and at least a portion of a payload field; a deadlock management module to associate the frame with a traffic class or a virtual channel and to encode the association in a field of the header field; and a transmitter circuit to transmit the frame to the node.

Example 70 may include the elements of the foregoing example, and the deadlock management module is further to adjust the value of a hop count field of the header field based on transmission through a network node element, and the expiration of the frame is based on the hop count.

Example 71 may include the elements of the foregoing example, and the expiration includes dropping the frame.

Example 72 may include the elements of the foregoing example, and the expiration includes re-associating the frame to a new traffic class or virtual channel.

According to Example 73 there is provided a method for enhanced Ethernet communication. The method may include receiving at least a portion of an Ethernet frame, the portion including a header field and at least a portion of a payload field; associating the frame with a traffic class or a virtual channel; encoding the association in a field of the header field; and transmitting the frame to the node.

Example 74 may include the elements of the foregoing example, further including adjusting the value of a hop count field of the header field based on transmission through a network node element, and the expiration of the frame is based on the hop count.

Example 75 may include the elements of the foregoing example, and the expiration includes dropping the frame.

Example 76 may include the elements of the foregoing example, and the expiration includes re-associating the frame to a new traffic class or virtual channel.

According to Example 77 there is provided at least one computer-readable storage medium having instructions stored thereon which when executed by a processor result in the following operations for enhanced Ethernet communication, including: receiving at least a portion of an Ethernet frame, the portion including a header field and at least a portion of a payload field; associating the frame with a traffic class or a virtual channel; encoding the association in a field of the header field; and transmitting the frame to the node.

Example 78 may include the elements of the foregoing example, further including the operation of adjusting the value of a hop count field of the header field based on transmission through a network node element, and the expiration of the frame is based on the hop count.

Example 79 may include the elements of the foregoing example, and the expiration includes dropping the frame.

Example 80 may include the elements of the foregoing example, and the expiration includes re-associating the frame to a new traffic class or virtual channel.

According to Example 81 there is provided a system for enhanced Ethernet communication. The system may include means for receiving at least a portion of an Ethernet frame, the portion including a header field and at least a portion of a payload field; means for associating the frame with a traffic class or a virtual channel; means for encoding the association in a field of the header field; and means for transmitting the frame to the node.

Example 82 may include the elements of the foregoing example, further including means for adjusting the value of a hop count field of the header field based on transmission through a network node element, and the expiration of the frame is based on the hop count.

Example 83 may include the elements of the foregoing example, and the expiration includes dropping the frame.

Example 84 may include the elements of the foregoing example, and the expiration includes re-associating the frame to a new traffic class or virtual channel.

According to Example 85 there is provided a network controller to communicate with a network node. The network controller may include a receiver circuit to receive an enhanced Ethernet frame including a padding field, and the enhanced frame eliminates an Ethernet frame preamble, start-of-frame delimiter and inter-packet gap; an overhead management module to adjust the padding field to maintain alignment of the enhanced frame on a selected bit boundary; and a transmitter circuit to transmit the enhanced frame to the node.

Example 86 may include the elements of the foregoing example, and the enhanced frame further includes a start of packet field, an enhanced header field, a payload field and an end of packet field.

Example 87 may include the elements of the foregoing example, and the selected bit boundary is a 64 bit boundary.

Example 88 may include the elements of the foregoing example, and the selected bit boundary is a 66 bit boundary.

According to Example 89 there is provided a method for enhanced Ethernet communication. The method may include receiving an enhanced Ethernet frame including a padding field, and the enhanced frame eliminates an Ethernet frame preamble, start-of-frame delimiter and inter-packet gap; adjusting the padding field to maintain alignment of the enhanced frame on a selected bit boundary; and transmitting the enhanced frame to the node.

Example 90 may include the elements of the foregoing example, and the enhanced frame further includes a start of packet field, an enhanced header field, a payload field and an end of packet field.

Example 91 may include the elements of the foregoing example, and the selected bit boundary is a 64 bit boundary.

Example 92 may include the elements of the foregoing example, and the selected bit boundary is a 66 bit boundary.

According to Example 93 there is provided at least one computer-readable storage medium having instructions stored thereon which when executed by a processor result in the following operations for enhanced Ethernet communication, including: receiving an enhanced Ethernet frame including a padding field, and the enhanced frame eliminates an Ethernet frame preamble, start-of-frame delimiter and inter-packet gap; adjusting the padding field to maintain alignment of the enhanced frame on a selected bit boundary; and transmitting the enhanced frame to the node.

Example 94 may include the elements of the foregoing example, and the enhanced frame further includes a start of packet field, an enhanced header field, a payload field and an end of packet field.

Example 95 may include the elements of the foregoing example, and the selected bit boundary is a 64 bit boundary.

Example 96 may include the elements of the foregoing example, and the selected bit boundary is a 66 bit boundary.

According to Example 97 there is provided a system for enhanced Ethernet communication. The system may include means for receiving an enhanced Ethernet frame including a padding field, and the enhanced frame eliminates an Ethernet frame preamble, start-of-frame delimiter and inter-packet gap; means for adjusting the padding field to maintain alignment of the enhanced frame on a selected bit boundary; and means for transmitting the enhanced frame to the node.

Example 98 may include the elements of the foregoing example, and the enhanced frame further includes a start of packet field, an enhanced header field, a payload field and an end of packet field.

Example 99 may include the elements of the foregoing example, and the selected bit boundary is a 64 bit boundary.

Example 100 may include the elements of the foregoing example, and the selected bit boundary is a 66 bit boundary.

According to Example 101 there is provided a network controller to communicate with a network node. The network controller may include a receiver circuit to receive at least a portion of an Ethernet frame, the portion including a header field and at least a portion of a payload field; a forwarding optimization module to generate a flow entropy field of the header field, the flow entropy field to specify a transmission path through node elements of a network fabric; and a transmitter circuit to forward the portion of the frame to the network node, the forwarding based on the flow entropy field.

Example 102 may include the elements of the foregoing example, and the network controller is incorporated in an end network node element or an intermediate network node element.

According to Example 103 there is provided a method for enhanced Ethernet communication. The method may include receiving at least a portion of an Ethernet frame, the portion including a header field and at least a portion of a payload field; generating a flow entropy field of the header field, the flow entropy field to specify a transmission path through node elements of a network fabric; and forwarding the portion of the frame to a network node, the forwarding based on the flow entropy field.

Example 104 may include the elements of the foregoing example, and the method is performed by an end network node element or an intermediate network node element.

According to Example 105 there is provided at least one computer-readable storage medium having instructions stored thereon which when executed by a processor result in the following operations for enhanced Ethernet communication, including: receiving at least a portion of an Ethernet frame, the portion including a header field and at least a portion of a payload field; generating a flow entropy field of the header field, the flow entropy field to specify a transmission path through node elements of a network fabric; and forwarding the portion of the frame to a network node, the forwarding based on the flow entropy field.

Example 106 may include the elements of the foregoing example, and the operations are performed by an end network node element or an intermediate network node element.

According to Example 107 there is provided a system for enhanced Ethernet communication. The system may include means for receiving at least a portion of an Ethernet frame, the portion including a header field and at least a portion of a payload field; means for generating a flow entropy field of the header field, the flow entropy field to specify a transmission path through node elements of a network fabric; and means for forwarding the portion of the frame to a network node, the forwarding based on the flow entropy field.

Example 108 may include the elements of the foregoing example, and the system is an end network node element or an intermediate network node element.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A network controller to communicate with a network node, said network controller comprising:
   a transmitter circuit to transmit a first Ethernet frame to said network node;
   a frame preemption circuitry to interrupt transmission of said first Ethernet frame to transmit a second Ethernet frame, wherein said second Ethernet frame has a higher priority than said first Ethernet frame, wherein based on interruption of transmission of said first Ethernet frame, a transmitted portion of the first Ethernet frame includes an indicator at an end of the transmitted portion of the first Ethernet frame of whether the transmitted portion of the first Ethernet frame is a last fragment or only fragment of the first Ethernet frame; and
   said frame preemption circuitry further to re-start transmission of a remaining fragment of said first Ethernet frame.

2. The network controller of claim 1, wherein said remaining fragment comprises an offset field to indicate a start of said remaining fragment relative to a previous frame fragment.

3. The network controller of claim 2, wherein said first Ethernet frame further comprises a fragment tag field to indicate an error status associated with said first Ethernet frame, wherein said offset field and said fragment tag field are provided to a receiver of said network node for reassembly of said first Ethernet frame.

4. The network controller of claim 1, wherein said priority of said first and second Ethernet frames are based on a Quality of Service (QoS) field, a traffic class field, a virtual channel field or a priority field in each of said first and second Ethernet frames.

5. The network controller of claim 1, wherein the first and second Ethernet frames are transmitted as part of a high performance computing (HPC) environment.

6. The network controller of claim 1, wherein the network controller is to operate in a manner consistent with IEEE 802.1Q.

7. A method for enhanced Ethernet communication comprising:
   transmitting a first Ethernet frame to a network node;
   interrupting transmission of said first Ethernet frame to transmit a second Ethernet frame, wherein said second Ethernet frame has a higher priority than said first Ethernet frame;
   including, in a transmitted portion of the first Ethernet frame, an indicator at an end of the transmitted portion of the first Ethernet frame of whether the transmitted portion of the first Ethernet frame is a last fragment or only fragment of the first Ethernet frame; and
   re-starting transmission of a remaining fragment of said first Ethernet frame.

8. The method of claim 7, further comprising including an offset field in said remaining fragment to indicate a start of said remaining fragment relative to a previous frame fragment.

9. The method of claim 8, wherein said first Ethernet frame further comprises a fragment tag field to indicate an error status associated with said first Ethernet frame.

10. The method of claim 9, further comprising, at a receiver, reassembling said first Ethernet frame based on said offset field and said fragment tag field.

11. The method of claim 7, further comprising determining said priority of said first Ethernet and second Ethernet frames based on a Quality of Service (QoS) field, a traffic class field, a virtual channel field or a priority field in each of said first and second Ethernet frames.

12. At least one non-transitory computer-readable storage medium having instructions stored thereon which when executed by a processor result in the following operations for enhanced Ethernet communication, comprising:
   transmitting a first Ethernet frame to a network node;
   interrupting transmission of said first Ethernet frame to transmit a second Ethernet frame, wherein said second Ethernet frame has a higher priority than said first Ethernet frame;
   including, in a transmitted portion of the first Ethernet frame, an indicator at an end of the transmitted portion of the first Ethernet frame of whether the transmitted portion of the first Ethernet frame is a last fragment or only fragment of the first Ethernet frame; and
   re-starting transmission of a remaining fragment of said first Ethernet frame.

13. The computer-readable storage medium of claim 12, further comprising: including an offset field in said remaining fragment to indicate a start of said remaining fragment relative to a previous frame fragment.

14. The computer-readable storage medium of claim 13, wherein said first Ethernet frame further comprises a fragment tag field to indicate an error status associated with said first Ethernet frame.

15. The computer-readable storage medium of claim 14, further comprising reassembling said first Ethernet frame based on said offset field and said fragment tag field.

16. The computer-readable storage medium of claim 12, further comprising determining said priority of said first and second Ethernet frames based on a Quality of Service (QoS) field, a traffic class field, a virtual channel field or a priority field in each of said first and second Ethernet frames.

* * * * *